(12) United States Patent
Chou

(10) Patent No.: US 6,812,773 B1
(45) Date of Patent: Nov. 2, 2004

(54) CHARGE PUMP CIRCUIT RELIABILITY WITHOUT DEGRADING PERFORMANCE

(75) Inventor: Shao-Yu Chou, Tao-Yuan (TW)

(73) Assignee: Taiwan Semiconductor Manufacturing Company, Hsin-Chu (TW)

(*) Notice: Subject to any disclaimer, the term of this patent is extended or adjusted under 35 U.S.C. 154(b) by 1 day.

(21) Appl. No.: 10/427,286

(22) Filed: May 1, 2003

(51) Int. Cl.[7] .................................................. G05F 3/24
(52) U.S. Cl. ........................ 327/536; 327/537; 363/60
(58) Field of Search ................................ 327/536, 537; 363/59, 60

(56) References Cited

U.S. PATENT DOCUMENTS

| | | | |
|---|---|---|---|
| 5,537,072 A | 7/1996 | Canclini | 327/374 |
| 5,818,289 A | 10/1998 | Chevallier et al. | 327/536 |
| 6,072,358 A | 6/2000 | Hung et al. | 327/536 |
| 6,459,328 B1 * | 10/2002 | Sato | 327/536 |
| 6,674,317 B1 * | 1/2004 | Chou | 327/536 |
| 6,690,227 B2 * | 2/2004 | Lee et al. | 327/536 |

* cited by examiner

*Primary Examiner*—Timothy P. Callahan
*Assistant Examiner*—Terry L. Englund
(74) *Attorney, Agent, or Firm*—Duane Morris LLP

(57) ABSTRACT

A method and circuit for improving reliability in charge pumping circuits. The reliability of charge pump circuits is degraded by continual voltage stress across the gate oxides of the field effect transistors in the charge pumping circuit. In this method and circuit, either diodes, or diode connected transistors, are connected to the gates of the field effect transistors in the charge pump circuits. The anodes of the diodes are connected to the gates of the FETs and the cathodes of the diodes are connected to the output node of the charge pump circuit. When the voltage at the output node of the charge pump circuit is high the diodes have no effect. When current is delivered to the load connected to the output node the voltage at the output node drops and the diodes help discharge the internal nodes of the charge pump circuits thereby reducing the voltage across the FET gate oxides.

20 Claims, 3 Drawing Sheets

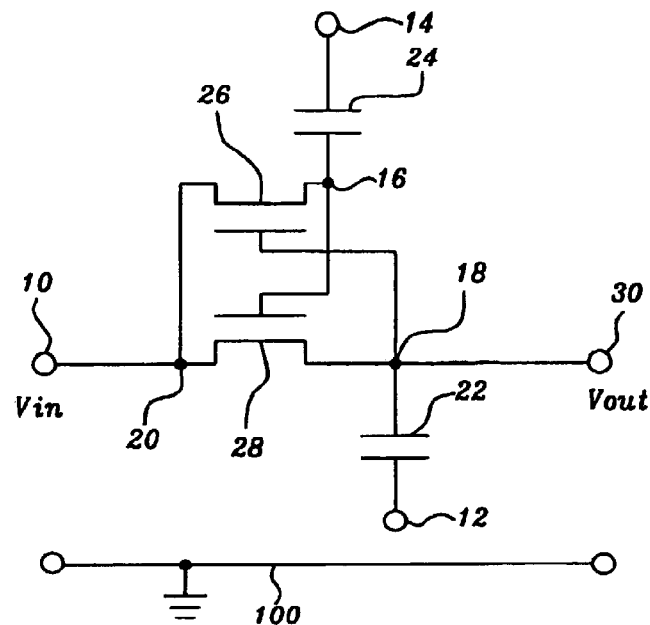
FIG. 1 – Prior Art
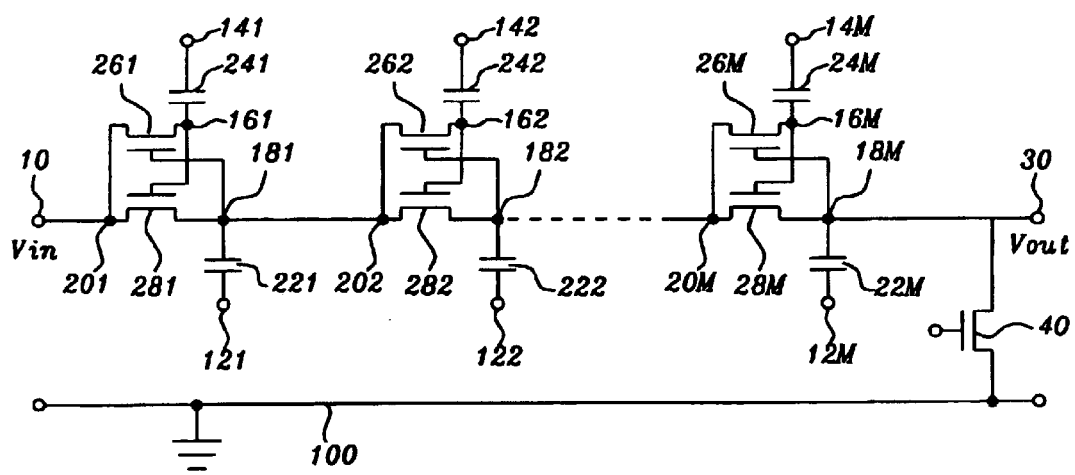
FIG. 2 – Prior Art

US 6,812,773 B1

CHARGE PUMP CIRCUIT RELIABILITY WITHOUT DEGRADING PERFORMANCE

BACKGROUND OF THE INVENTION (1) Field of the Invention

This invention relates to improving the reliability of charge pump circuits, and more specifically to improving the reliability of charge pump circuits by providing means to discharge the gates of field effect transistors between pumping cycles.

(2) Description of the Prior Art

Charge pump circuits are used to generate high voltage in circuits with only low voltage supplies available, such as low voltage flash EEPROM circuits. After the charge pumping operation charge is stored in the internal nodes of the charge pumping circuit which is then discharged into the load. The discharge into a load may not completely discharge the charges stored in the internal nodes resulting in voltage stress on FET gate oxides. This voltage stress can result in a loss of circuit reliability.

U.S. Pat. No. 6,072,358 to Hung et al. describes charge pump circuitry which reduces the voltage stress on transistor gate oxides by biasing the charge pump circuit such that the voltage across the gate oxide is reduced.

U.S. Pat. No. 5,818,289 to Chevallier et al. describes a charge pump circuit which uses a charge transfer switch and associated clocking scheme which reduces the current required to operate the charge pump.

U.S. Pat. No. 5,537,072 to Canclini describes a charge pump circuit which reduces high voltage damage. The switch circuit has a first transistor for conducting current and is controlled by second, third, and fourth transistors. The second transistors protects the first transistor from excessive gate to drain voltage. The third transistor serves as a cascoding transistor protecting the fourth transistor from excessive gate to drain voltage.

SUMMARY OF THE INVENTION

Charge pump circuits are often used to generate high voltages for circuits such as EEPROM circuits. These charge pump circuits usually use FETs in the internal stages of the charge pump circuits. The charge pumping operation stores charge at internal nodes of the circuit to generate the high voltages required. This stored charge produces voltage stress across the FET gate oxide. During the period when the high voltage is delivered to a load the internal nodes are discharged, however often they are not completely discharged leaving continual voltage stress across the FET gate oxides. The reliability of FETs in the charge pump circuits can be degraded by this continual high voltage stress across the FET gate oxides.

It is a principle objective of this invention to provide a method of discharging the internal nodes after current has been delivered to the load, thereby reducing the high voltage stress on the FET gate oxides and improving FET reliability.

It is another principle objective of this invention to provide a circuit which discharges the internal nodes after current has been delivered to the load, thereby reducing the high voltage stress on the FET gate oxides and improving FET reliability.

These objectives are achieved by connecting diodes, or diode connected transistors, to the internal nodes of the charge pump circuits. The anodes of the diodes are connected to the gates of the FETs in the charge pump circuit The cathodes of the diodes are connected to the output node of the charge pump circuit. When the voltage at the output node of the charge pump circuit is high the diodes have no effect. When current is delivered to the load connected to the output node the voltage at the output node drops and the diodes help discharge the internal nodes of the charge pump circuits thereby reducing the voltage across the FET gate oxides.

BRIEF DESCRIPTION OF THE DRAWINGS

FIG. 1 shows a schematic diagram of a conventional charge pumping stage.

FIG. 2 shows a schematic diagram of a number of conventional charge pumping stages connected in series to form a conventional charge pumping circuit.

DESCRIPTION OF THE PREFERRED EMBODIMENTS

Figure 3:
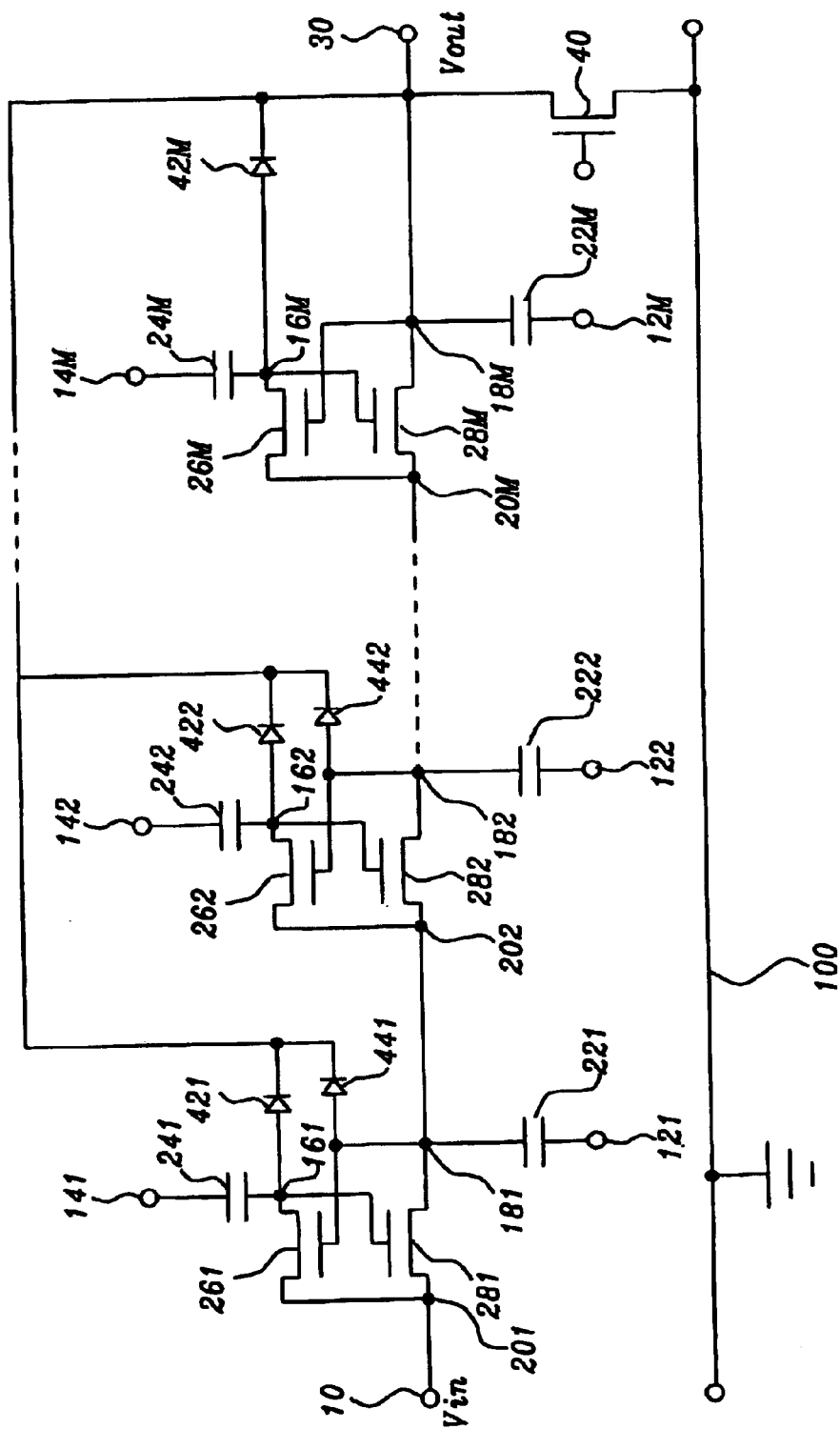
FIG. 3 shows a charge pumping circuit of this invention having diodes with anodes connected to the internal nodes of the charge pumping circuit and cathodes connected to the output node of the charge pumping circuit.

Refer now to FIGS. 1–4 for a description of the method and circuit of this invention. FIG. 1 shows a schematic diagram of a single charge pumping stage for a conventional charge pump circuit. The single charge pumping stage has a first node 20, a second node 16, a third node 18, and a ground node 100 to indicate that all voltages described herein are referenced to ground potential. The first node 20 is connected to an input node 10 and the third node 18 is connected to an output node 30 The charge pumping stage also has a first clock node 12 and a second clock node 14. The charge pump stage comprises a first transistor 26 and a second transistor 28. In this example the first transistor 26 and second transistor 28 are both NFETs or N channel field effect transistors. The gate of the first transistor 26 is connected to the third node 18 and the gate of the second transistor 28 is connected to the second node 16. A first capacitor 22 is connected between the third node 18 and the first clock node 12. A second capacitor 24 is connected between the second node 16 and the second clock node 14. In the charge pumping operation clock signals at the first clock node 12 and second clock node 14 charge the first capacitor 22 and second capacitor 24.

FIG. 2 shows a schematic diagram of a conventional charge pump circuit formed by connecting M, wherein M is a positive integer, of the charge pump circuit stages shown in FIG. 1 in series. In this conventional charge pump circuit the first node 201 of the first stage is connected to the input node 10. As shown in FIG. 2 the third node; 181, 182, . . . ; of each of the stages 1 through M−1 is connected to the first node; 202, . . . , 20M; of one of each of stages 2 through M. The third node 18M of stage M is connected to the output node. Each of the stages has a second node 161, 162, . . . , 16M; a first transistor 261, 262 . . . , 26M; a second transistor 281, 282, . . . , 28M; a first capacitor 221, 222, . . . , 22M; a second capacitor 241, 242, . . . , 24M; a first clock node 121, 122, . . . , 12M; and a second clock node 141, 142, . . . , 14M connected as shown in FIG. 2. The third node 18M of stage M is connected to the output node 30. A load is connected between the output node 30 and the ground node 100. In this example a transistor 40 is connected between the output node 30 and the ground node 100.

In the conventional charge pump circuit shown in FIG. 2 the clock signals at the first clock nodes 121, 122, . . . , 12M and the second clock nodes 141, 142, . . . , 14M charge the first capacitors 221, 222, . . . , 22M and the second capacitors 241, 242, . . . , 24M to provide a high voltage at the output node 30. The high voltage at the output node is fed to a load, typically a flash EEPROM circuit, so that current is periodically fed from the output node 30 to the ground node 100 through the load which discharges the internal nodes of the charge pump circuit. Usually, however the load current does not discharge the internal nodes completely so that continued high voltages remain at the second nodes 161, 162, . . . , 16M and third nodes 181, 182, . . . , 18M. This continued high voltages at the second nodes and third nodes produces voltage stress across the gate oxides of the first transistors 261, 262, . . . , 26M and the second transistors 281, 282, . . . , 28M. This voltage stress on the gate oxides of the first and second transistors adversely affects the reliability of the first and second transistors and thus the charge pump circuit.

FIG. 3 shows the charge pump circuit of this invention which uses diodes to reduce the voltage stress across the gate oxides of the first transistors 261, 262, . . . , 26M and second transistors 281, 282, . . . , 28M. The circuit of FIG. 3 is exactly the same as the circuit of FIG. 2 except for the addition of M−1 first diodes 441, 442, . . . and M second diodes 421, 422, . . . , 42M. The anode of each of the M−1 first diodes 441, 442, . . . is connected to the third node 181, 182, . . . of each of the stages 1 through M−1. There is no diode connected to the third node 18M of stage M because the third node 18M is connected directly to the output node and thus to the load. The anode of one each of the second diodes 421, 422, . . . , 42M is connected to the second node 161, 162, . . . , 16M of each of the stages 1 through M. The cathodes of all of the M−1 first diodes 441, 442, . . . and the cathodes of all of the M second diodes 421, 422, . . . , 42M are connected to the output node 30.

In this invention the charge pump circuit can be a two phase or a four phase charge pump circuit, however the circuit will typically be a four phase charge pump circuit. In this invention M is typically four but can be more or less than four. M will usually be at least two.

When the output node 30 is not supplying current to a load the voltage at the output node 30 will be high, all of the first diodes 421, 422, . . . , 42M and all of the second diodes 441, 442, . . . will be reverse biased and the first and second diodes will have no effect on the circuit operation. When the output node 30 discharges current into a load the voltage at the output node 30 drops, the first and second diodes become forward biased and the charges stored at the third nodes 181, 182, . . . , 18M and the second nodes 161, 162, . . . , 16M are discharged. There is no first diode needed or used at the third node 18M of stage M since the third node 18M of stage M is connected directly to the output node 30 and the current through the load effectively discharges the charge stored at the third node 18M of stage M. In this manner the voltage stress across the gate oxides of the first transistors 261, 262, . . . , 26M and the second transistors 281, 282, . . . , 28M is substantially reduced and the reliability of the first and second transistors is substantially improved.

Figure 4:
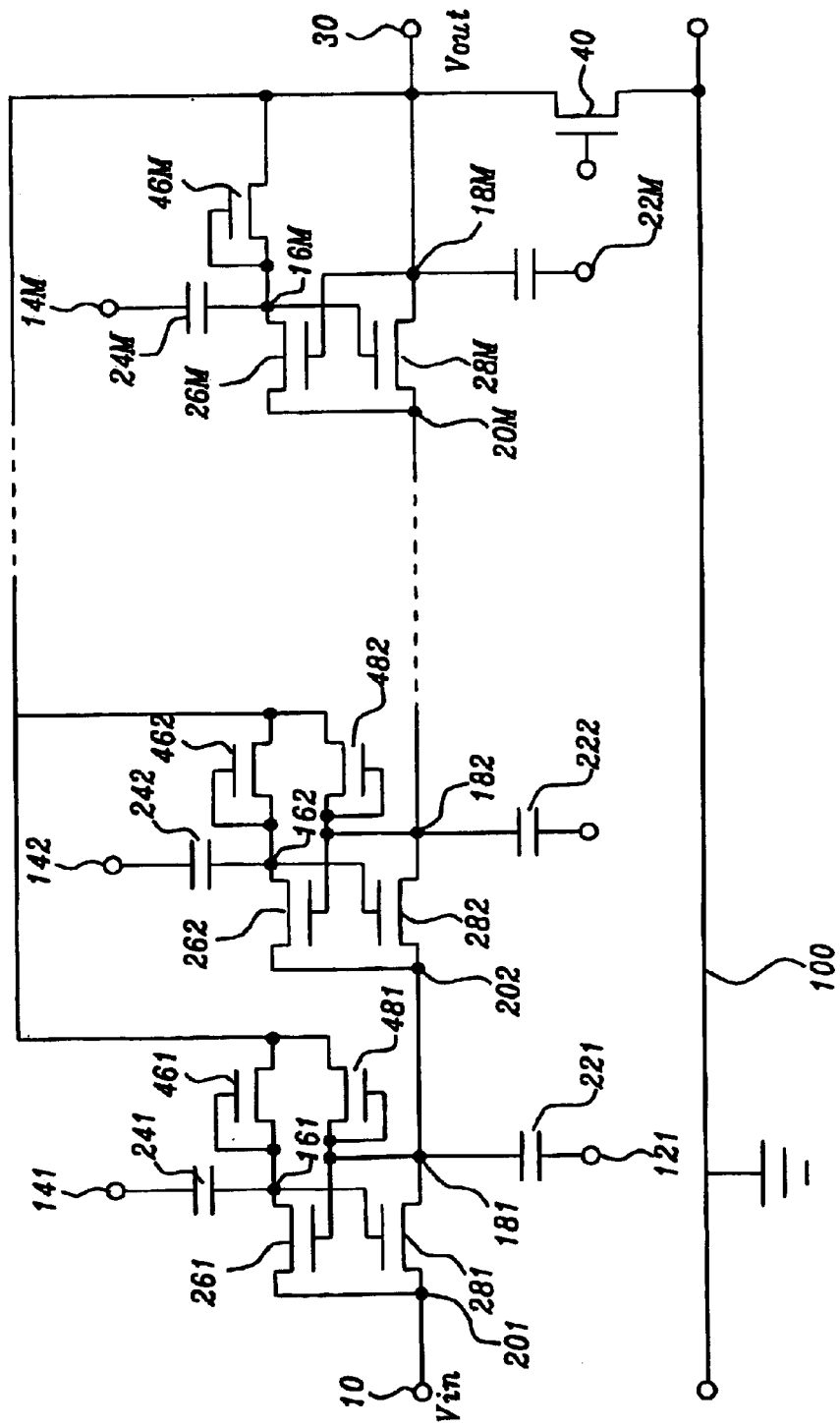
FIG. 4 shows the charge pumping circuit of this invention with diode connected FETs replacing the diodes.

Another embodiment of this invention is shown in the circuit shown in FIG. 4. The circuit shown in FIG. 4 is exactly the same as the circuit shown in FIG. 3 except that the diodes are replaced by transistors connected in diode mode. FIG. 4 shows each of the first diodes replaced by M−1 third transistors 481, 482, . . . and each of the second diodes replaced by M fourth transistors 461, 462, . . . , 46M connected in diode mode with the gate and source connected together. In this example the third and fourth transistors are N channel field effect transistors. The common source-gate forms the anode of the diode and the drain forms the cathode of the diode. FIG. 4 shows the common source-gate of the M−1 third transistors 481, 482, . . . connected to the third node 181, 182, . . . of stages 1 through M−1 and the common source-gate of the M fourth transistors 461, 462, . . . , 46M connected to the second node 161, 162, . . . , 16M of the M stages. The drains of all of the M−1 third transistors 481, 482, . . . and all of the M fourth transistors 461, 462, . . . , 46M are all connected to the output node 30. The operation of the circuit shown in FIG. 4 is exactly the same as the circuit shown in FIG. 3 with the diode connected third and fourth transistors operating as the first and second diodes.

While the invention has been particularly shown and described with reference to the preferred embodiments thereof, it will be understood by those skilled in the art that various changes in form and details may be made without departing from the spirit and scope of the invention.

What is claimed is:

1. A method to improve charge pump circuit reliability, comprising:

providing M circuit stages, numbered 1 through M wherein M is a positive integer greater than one, each of said circuit stages has a first node, a second node, a third node, a first clock node, a second clock node, a first field effect transistor having a gate connected to said third node, a second field effect transistor having a gate connected to said second node, a first capacitor connected between said third node and said first clock node, and a second capacitor connected between said second node and said second clock node;

providing a ground potential node as a reference node for said charge pump circuit;

forming said charge pump circuit having an input node and an output node by connecting said M circuit stages in series wherein said first node of stage 1 is connected to said input node, said third node of a respective one of said stages 1 through M−1 is connected to said first node of a corresponding one of said stages 2 through M, and said third node of stage M is connected to said output node;

providing M−1 first diodes wherein each of said first diodes has an anode and a cathode;

providing M second diodes wherein each of said second diodes has an anode and a cathode;

connecting said anode of a respective one of said first diodes to said third node of a corresponding one of said stages 1 through M−1;

connecting said anode of a respective one of said second diodes to said second node of a corresponding one of said stages 1 through M; and connecting said cathodes of all of said first diodes and said cathodes of all of said second diodes to said output node.

2. The method of claim 1 further comprising a load circuit connected between said output node and said ground potential node.

3. The method of claim 2 wherein said load circuit draws current from said output node.

4. The method of claim 1 wherein said charge pump circuit is a four phase charge pump circuit.

5. The method of claim 1 wherein said charge pump circuit is a two phase charge pump circuit.

6. The method of claim 1 wherein each of said first field effect transistors is an N channel field effect transistor.

7. The method of claim 1 wherein each of said second field effect transistors is an N channel field effect transistor.

8. The method of claim 1 wherein each of said M−1 first diodes are replaced by a third field effect transistor having a source connected to a gate forming said anode and a drain forming said cathode.

9. The method of claim 1 wherein each of said M second diodes are replaced by a third field effect transistor having a source connected to a gate forming said anode and a drain forming said cathode.

10. The method of claim 1 further comprising a third field effect transistor connected between said output node and said ground potential node.

11. A circuit having improved reliability, comprising:

M circuit stages, numbered 1 through M wherein M is a positive integer greater than one, each of said circuit stages has a first node, a second node, a third node, a first clock node, a second clock node, a first field effect transistor having a gate connected to said third node, a second field effect transistor having a gate connected to said second node, a first capacitor connected between said third node and said first clock node, and a second capacitor connected between said second node and said second clock node;

a ground potential node as a reference node for said circuit;

a charge pump circuit having an input node and an output node formed by connecting said M circuit stages in series wherein said first node of stage 1 is connected to said input node, said third node of a respective one of said stages 1 through M−1 is connected to said first node of a corresponding one of said stages 2 through M, and said third node of stage M is connected to said output node;

M−1 first diodes wherein a respective one of said first diodes has an anode connected to said third node of a corresponding one of said stages 1 through M−1 and a cathode connected to said output node; and M second diodes wherein a respective one of said second diodes has an anode connected to said second node of a corresponding one of said stages 1 through M and a cathode connected to said output node.

12. The circuit of claim 11 further comprising a load circuit connected between said output node and said ground potential node.

13. The circuit of claim 12 wherein said load circuit draws current from said output node.

14. The circuit of claim 11 wherein said charge pump circuit is a four phase charge pump circuit.

15. The circuit of claim 11 wherein said charge pump circuit is a two phase charge pump circuit.

16. The circuit of claim 11 wherein each of said first field effect transistors is an N channel field effect transistor.

17. The circuit of claim 11 wherein each of said second field effect transistors is an N channel field effect transistor.

18. The circuit of claim 11 wherein each of said M−1 first diodes are replaced by a diode connected third field effect transistor having a source connected to a gate forming said anode and a drain forming said cathode.

19. The circuit of claim 11 wherein each of said M second diodes are replaced by a diode connected third field effect transistor having a source connected to a gate forming said anode and a drain forming said cathode.

20. The circuit of claim 11 further comprising third field effect transistor connected between said output node and said ground potential node.

* * * * *